(12) United States Patent
Suzuki et al.

(10) Patent No.: US 8,901,242 B2
(45) Date of Patent: Dec. 2, 2014

(54) COMPOSITE FILM

(75) Inventors: Hidenori Suzuki, Ibaraki (JP);
Masanori Uesugi, Ibaraki (JP); Makoto Kai, Ibaraki (JP); Mitsuyoshi Shirai, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 619 days.

(21) Appl. No.: 12/678,442

(22) PCT Filed: Apr. 8, 2009

(86) PCT No.: PCT/JP2009/057202
§ 371 (c)(1),
(2), (4) Date: Mar. 16, 2010

(87) PCT Pub. No.: WO2009/139241
PCT Pub. Date: Nov. 19, 2009

(65) Prior Publication Data
US 2010/0196704 A1    Aug. 5, 2010

(30) Foreign Application Priority Data

May 14, 2008  (JP) ................................ 2008-126710

(51) Int. Cl.
| | | |
|---|---|---|
| *B32B 27/00* | (2006.01) | |
| *B32B 27/40* | (2006.01) | |
| *C03C 25/10* | (2006.01) | |
| *C08F 2/50* | (2006.01) | |
| *C08G 18/08* | (2006.01) | |
| *C08G 18/28* | (2006.01) | |
| *C08G 73/10* | (2006.01) | |
| *C08K 5/34* | (2006.01) | |
| *C08K 5/48* | (2006.01) | |
| *C08K 5/3435* | (2006.01) | |
| *C08L 75/00* | (2006.01) | |
| *C09J 151/08* | (2006.01) | |
| *C08G 18/48* | (2006.01) | |
| *C08G 18/75* | (2006.01) | |
| *C08L 51/08* | (2006.01) | |
| *C08F 283/00* | (2006.01) | |

(52) U.S. Cl.
CPC ............ *C08G 18/4854* (2013.01); *C09J 151/08* (2013.01); *C08G 2270/00* (2013.01); *C08G 18/757* (2013.01); *C08L 51/08* (2013.01); *C08F 283/006* (2013.01)
USPC ............ 524/590; 428/423.1; 522/38; 522/64; 522/96; 524/86; 524/99; 524/104; 524/507; 524/589

(58) Field of Classification Search
USPC .................... 524/86, 99, 104, 507, 589, 590; 428/423.1; 522/38, 64, 96
See application file for complete search history.

(56) References Cited

U.S. PATENT DOCUMENTS 6,136,880 A * 10/2000 Snowwhite et al. ............ 522/64

FOREIGN PATENT DOCUMENTS

| | | |
|---|---|---|
| CN | 1260812 A | 7/2000 |
| CN | 1746249 A | 3/2006 |
| JP | 10-287824 | 10/1998 |
| JP | 10-337823 | 12/1998 |
| JP | 11-189762 | 7/1999 |
| JP | 11-322819 | 11/1999 |
| JP | 2000-169511 | 6/2000 |
| JP | 2001-520127 A | 10/2001 |
| JP | 2003-096140 | 4/2003 |
| JP | 2003-096140 A | 4/2003 |
| JP | 2003-171411 | 6/2003 |
| JP | 2003-171411 A | 6/2003 |
| JP | 2004-138855 | 5/2004 |
| JP | 2006-077072 A | 3/2006 |
| JP | 2009-120663 A | 6/2009 |
| WO | 99/19414 | 4/1999 |

OTHER PUBLICATIONS

Notification of Second Office Action issued in corresponding Chinese Application No. 200980000505.5 dated Feb. 7, 2013.
Notification of Reason(s) for Refusal issued in corresponding Japanese Application No. 2009-112040 dated Feb. 26, 2013.
Ciba IRGACURE 819, Ciba Specialty Chemicals Inc., Aug. 30, 2001, p. 1-3.
Ciba IRGACURE 184, Ciba Specialty Chemicals Inc., Sep. 4, 2001, p. 1-3.
Lucirin TPO, BASF Corporation, Jun. 2001, p. 1-4.
Chinese Office Action issued in Application No. 200980000505.5 dated Jun. 29, 2012.

* cited by examiner

*Primary Examiner* — Patrick Niland
(74) *Attorney, Agent, or Firm* — Sughrue Mion, PLLC

(57) ABSTRACT

[Problem] To provide a composite film having light-curing property and weather resistance.
[Means for solving] A composite film is one that comprises at least a urethane polymer, wherein both an initial b* value of the composite film measured by a spectrocolorimeter (value at an angle of 15 degrees) and a b* value after performing an accelerated weathering test for 120 hours (value at an angle of 15 degrees) are 4.0 or less, and a non-volatile component after heating the composite film at 130° C. for two hours is 96% or more.

16 Claims, No Drawings

COMPOSITE FILM

TECHNICAL FIELD

The present invention relates to a composite film containing at least a urethane polymer, and in particular to a composite film having light-curing property and weathering resistance.

BACKGROUND ART

Composite films containing acrylic based polymers and urethane polymers are known as films that can have both high strength and high breaking extention. In JP 2001-520127 W, a multi-layered film is disclosed which comprises an interpenetrating polymer network layer (IPN layer) and at least one fluoro-containing polymer layer used as a film for protecting surfaces of automobiles and the like. An IPN composite material containing a urethane polymer and an acrylic polymer is used for forming the IPN layer in the multi-layered film. The IPN layer is prepared by applying a mixture of an acrylic monomer, an acrylic crosslinking agent, and a crosslinked urethane precursor obtained by using a polyol and a polyisocyanate, on a substrate and by polymerizing and crosslinking the acrylic monomer and the polyol/polyisocyanate which is a urethane precursor, with heat in an incoherent manner.

According to the method, there is an advantage of not likely to occurring limitations (restrictions) due to the kind, combination, blending ratio, and the like of the monomers used therein. However, urethane polymerization is a polyaddition reaction, which is slow in comparison with a chain reaction of, for example acryl, so that there has been a problem in terms of productivity.

In order to solve such a problem of productivity, when an IPN layer is obtained by utilizing successive reaction and photopolymerization as disclosed in JP 2003-96140 A, the crosslinked urethane polymer becomes in a swollen state in the presence of the acrylic monomer and the crosslinking agent, so that such a problem has occurred that the viscosity of the syrup is remarkably increased and the application on the substrate by coating or casting has become extremely difficult.

In addition, dusts and pebbles sometimes hit on a painted surface of the body while driving an automobile or the like, and in particular when driving on a road surface in a poor roadway condition or a road surface having rock salt, sand and gravels spread thereon in aid of snow-removal in cold regions, the painted surface is easily damaged and there is a problem of generating rust from the damaged portion on the painted surface. In the automobile industries, a transparent adhesive tape is sometimes applied to prevent from causing damage to painted surfaces of automobile bodies. Polyurethane substrates are used as a substrate for such a transparent adhesive tape.

However, polyurethane is known to create a colored substance having a conjugated structure or a nitrogen-containing colored substance due to a photoreaction. Accordingly, a film containing polyurethane is initially colorless and transparent, but the film after being remained outdoors shows yellowing by being exposed to ultraviolet rays and also the surface sheen may disappear and the good appearance may be decreased.

Although an ultraviolet absorber can be added in order to prevent yellowing, when a film is formed by carrying out a photopolymerization reaction by using a photopolymerization initiator, functions of the photopolymerization initiator is not sometimes exhibited sufficiently due to the coexistence of the ultraviolet absorber and a sufficient photopolymerization reaction does not occur, so that the curing property deteriorates.

In addition, although a hindered amine light stabilizer can be added in order to prevent yellowing, that is in the state of coexisting the hindered amine light stabilizer which suppresses a photopolymerization reaction (namely, traps radicals), so that the curing property deteriorates in curing by a radical polymerization reaction with a photopolymerization initiator.

That is, there is not yet a film having a urethane based polymer which is obtained by sufficient light-curing in the state of being added both an ultraviolet absorber and a light stabilizer, and has weathering resistance (yellowing resistance).

PRIOR ART TECHNICAL DOCUMENTS

Patent Document 1: National publication number of Japanese translation of PCT international application 2001-520127

Patent Document 2: Japanese Patent Application Laid-open Publication No. 2003-96140

DISCLOSURE OF THE INVENTION

Problem to be Solved by the Invention

The present invention has been made with a view to solving the above-mentioned problems and it is an object of the present invention to provide a composite film having light-curing property and weathering resistance.

Means for Solving the Problem

The present invention provides a composite film comprising at least a urethane polymer, wherein both an initial b* value of the composite film measured by a spectrocolorimeter (value at an angle of 15 degrees) and a b* value after being performed an accelerated weathering test for 120 hours (value at an angle of 15 degrees) are 4.0 or less, and a non-volatile component after heating the composite film at 130° C. for two hours is 96% or more.

It is preferred that the composite film of the present invention, wherein further a b* value after performing an accelerated weathering test for 240 hours (value at an angle of 15 degrees) measured by a spectrocolorimeter is 4.0 or less.

It is preferred that the composite film is a composite film having a (meth)acrylic based polymer and a urethane polymer.

It is preferred that the composite film of the present invention comprises at least one of ultraviolet absorber and at least one of hindered amine light stabilizer.

In the present invention, the composite film can be obtained by irradiating a precursor mixture in which at least one of ultraviolet absorber, at least one of hindered amine light stabilizer, and at least one of acylphosphine based photopolymerization initiator are added in a composite film precursor having at least a urethane polymer, with a light in a photosensitive wavelength range of the photopolymerization initiator. It is preferred that the composite film precursor is one that has a (meth)acrylic based monomer and a urethane polymer.

In the present invention, it is preferred that the acylphosphine based photopolymerization initiator includes at least one of monoacylphosphine oxides represented by the following formula (I) and/or at least one of diacylphosphine oxides represented by the following formula (II).

[compound 4]

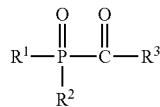

(I)

[In the formula, $R^1$ represents an alkyl group of $C_1$-$C_{18}$; an alkyl group of $C_1$-$C_4$, a cycloalkyl group of $C_5$-$C_8$, a phenylalkyl group of $C_7$-$C_9$, a phenyl group, a naphthyl group, or a biphenyl group, substituted by halogen or an alkoxy group of $C_1$-$C_6$; a phenyl group, a naphthyl group, or a biphenyl group, substituted by at least one selected from the group consisting of halogen, an alkyl group of $C_1$-$C_{12}$, and an alkoxy group of $C_1$-$C_{12}$; or a five-membered or six-membered heterocyclic group containing a monovalent N, O, or S; $R^2$ represents a phenyl group, a naphthyl group, or a biphenyl group; a phenyl group, a naphthyl group, or a biphenyl group, substituted by at least one selected from the group consisting of halogen, an alkyl group of $C_1$-$C_{12}$, and an alkoxy group of $C_1$-$C_{12}$; a five-membered or six-membered heterocyclic group containing a monovalent N, O, or S, an alkoxy group of $C_1$-$C_{18}$, or a phenoxy group; or a phenoxy group, a benzyloxy group, or a cyclohexyloxy group, substituted by halogen, an alkyl group of $C_1$-$C_4$, or an alkoxy group of $C_1$-$C_4$; or $R^2$ and $R^1$ form a ring together with a phosphorus atom; $R^3$ represents an alkyl group of $C_1$-$C_{18}$; an alkyl group of $C_1$-$C_4$, a cycloalkyl group of $C_5$-$C_8$, a phenylalkyl group of $C_7$-$C_9$, a phenyl group, a naphthyl group, or a biphenyl group, substituted by halogen or an alkoxy group of $C_1$-$C_6$; a phenyl group, a naphthyl group, or a biphenyl group, substituted by at least one selected from the group consisting of halogen, an alkyl group of $C_1$-$C_{12}$, and an alkoxy group of $C_1$-$C_{12}$; a five-membered or six-membered heterocyclic group containing a monovalent N, O, or S; or represents a group represented by the following formula:

[compound 5]

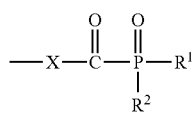

wherein, X represents an alkylene group of $C_2$-$C_8$ or a cyclohexylene group; or represents a phenylene group or a biphenylene group, unsubstituted or substituted by halogen, an alkyl group of $C_1$-$C_4$ or an alkoxy group of $C_1$-$C_4$.]

[compound 6]

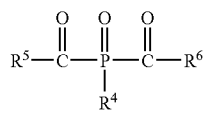

(II)

[In the formula, $R^4$ represents an alkyl group of $C_1$-$C_{18}$; an alkyl group of $C_1$-$C_4$, a cycloalkyl group of $C_5$-$C_8$, a phenylalkyl group of $C_7$-$C_9$, a phenyl group, a naphthyl group, or a biphenyl group, substituted by halogen or an alkoxy group of $C_1$-$C_6$; a phenyl group, a naphthyl group, or a biphenyl group, substituted by at least one selected from the group consisting of halogen, an alkyl group of $C_1$-$C_{12}$, and an alkoxy group of $C_1$-$C_{12}$; a five-membered or six-membered heterocyclic group containing a monovalent N, O, or S, an alkoxy group of $C_1$-$C_{18}$, or a phenoxy group; or a phenoxy group, a benzyloxy group, a cyclohexyloxy group, substituted by halogen, an alkyl group of $C_1$-$C_4$, or an alkoxy group of $C_1$-$C_4$; and $R^5$ and $R^6$, independently from each other, represent an alkyl group of $C_1$-$C_{18}$; an alkyl group of $C_1$-$C_4$, a cycloalkyl group of $C_5$-$C_8$, a phenylalkyl group of $C_7$-$C_9$, a phenyl group, a naphthyl group, or a biphenyl group, substituted by halogen or an alkoxy group of $C_1$-$C_6$; a phenyl group, a naphthyl group, or a biphenyl group, substituted by at least one selected from the group consisting of halogen, an alkyl group of $C_1$-$C_{12}$, and an alkoxy group of $C_1$-$C_{12}$; or a five-membered or six-membered heterocyclic group containing a monovalent N, O, or S.]

In the present invention, it is preferred that the precursor mixture further contains an α-hydroxyalkylphenone based photopolymerization initiator.

In the present invention, it is preferred that the ultraviolet absorber contains at least one of ultraviolet absorber selected from the group consisting of benzotriazole based ultraviolet absorbers and hydroxyphenyltriazine based ultraviolet absorbers.

In the present invention, it is preferred that a blending amount of the photopolymerization initiator is 0.05 weight % or more and 4.0 weight % or less based on the amount of a (meth)acrylic component.

In addition, it is preferred that a blending amount of the ultraviolet absorber is 0.1 weight % or more and 4.0 weight % or less based on 100 weight % of the composite film precursor.

In addition, it is preferred that a blending amount of the hindered amine light stabilizer is 0.1 weight % or more and 4.0 weight % or less based on 100 weight % of the composite film precursor.

In the present invention, it is preferred that the urethane based polymer is formed by using at least one of diisocyanate selected from the group consisting of methylcyclohexane diisocyanate (hydrogenated TDI), dicyclohexylmethane diisocyanate (hydrogenated MDI), cyclohexane diisocyanate (hydrogenated PPDI), bis(isocyanatomethyl)cyclohexane (hydrogenated XDI), norbornene diisocyanate (NBDI), isophorone diisocyanate (IPDI), hexamethylene diisocyanate (HDI), butane diisocyanate, 2,4-trimethylhexamethylene diisocyanate, and 2,4,4-trimethylhexamethylene diisocyanate.

In the present invention, when the composite film is one that has a (meth)acrylic based polymer and a urethane based polymer, it is preferred that a weight ratio of the (meth)acrylic based polymer and the urethane based polymer in the composite film is within the range of acrylic based polymer/urethane based polymer=1/99 to 80/20.

In the present invention, it is preferred that the composite film contains 1 weight % or more and 15 weight % or less of an acrylic acid based monomer.

The present invention also provides an adhesive sheet, including an adhesive layer on at least one surface of the composite film according to any one of the above.

In the present invention, it is preferred that the adhesive sheet is used as a protective sheet for protecting a surface of an adherend.

Effects of the Invention

According to the present invention, a composite film having light-curing property and weathering resistance can be achieved. In addition, according to the present invention, it is possible to provide a composite film having the sufficient strength and causing no problem of an odor.

MODE FOR CARRYING OUT THE INVENTION

Hereinafter, the present invention is explained in detail.

A composite film of the present invention is a film having at least a urethane based polymer, namely the film has a urethane based polymer alone or further also another polymer. In the present invention, the composite film has preferably a (meth)acrylic based polymer and a urethane based polymer. In such a case, a weight ratio of the (meth)acrylic based polymer to the urethane based polymer in the composite film is preferably within the range of: (meth)acrylic based polymer/urethane based polymer=1/99 to 80/20. When the weight ratio of the (meth)acrylic based polymer is less than 1/99, the viscosity of the precursor mixture may become high to cause poor workability, when the weight ratio is more than 80/20, the flexibility and the strength as a film cannot be obtained in some cases.

In the present invention, the (meth)acrylic based polymer is preferably obtained by using an acrylic component containing at least a (meth)acrylic acid based monomer and a monofunctional (meth)acrylic based monomer, and in particular, a monofunctional (meth)acrylic based monomer in which a homopolymer has a glass transition temperature (Tg) of 0° C. or more can preferably be used. Further, in the present invention, the (meth)acrylic based polymer is preferably obtained by using an acrylic component further containing a monofunctional (meth)acrylic based monomer in which a homopolymer has a glass transition temperature (Tg) of less than 0° C.

In the present invention, the (meth)acrylic acid based monomer is a (meth)acrylic based monomer having a carboxyl group, and for example, includes acrylic acid, methacrylic acid, maleic acid, crotonic acid, and the like. Among them, acrylic acid is particularly preferred. When the composite film precursor is one that has a (meth)acrylic based monomer and a urethane polymer, the content of the (meth)acrylic acid based monomer is 1 weight % or more and 15 weight % or less in the composite film precursor, and is preferably 2 weight % or more and 10 weight % or less. When the content of the (meth)acrylic acid based monomer is less than 1 weight %, such problems may occur that the reaction requires a long time, making film is very difficult, or the strength of the film is not sufficient. When the content of the (meth)acrylic acid based monomer is more than 15 weight %, the film may have a high water-absorbing ratio to cause a problem in water resistance. In the above case, the (meth) acrylic acid based monomer greatly influences the compatibility with the urethane component and the acrylic component in the present invention, therefore the (meth)acrylic acid based monomer is an essential constitutional element having an extremely important function.

In the present invention, the term "film" as used herein also refers to a sheet and the term "sheet" as used herein also refers to a film. Further, in the present invention, the term "(meth) acryl" such as a (meth)acrylic based polymer and a (meth) acrylic acid based monomer, as used herein refers to methacryl and/or acryl. In addition, the term "acryl" as used herein also refers to acryl and/or methacryl if there is no problem from the standpoint of common sense.

In the present invention, examples of the monofunctional (meth)acrylic based monomer having Tg of 0° C. or more, include acryloylmorpholine, isobornyl acrylate, dicyclopentanyl acrylate, t-butyl acrylate, cyclohexyl acrylate, lauryl acrylate and the like. The monofunctional (meth)acrylic based monomers can be used alone or as combinations of two or more of them.

In the present invention, as the monofunctional (meth) acrylic based monomers having Tg of 0° C. or more are preferably used at least one selected from the group consisting of acryloylmorpholine, isobornyl acrylate and dicyclopentanyl acrylate, more preferably acryloylmorpholine and/or isobornyl acrylate, or acryloylmorpholine and/or dicyclopentanyl acrylate, and particularly preferably isobornyl acrylate.

The content of the monofunctional (meth)acrylic based monomers having Tg of 0° C. or more is preferably 20 weight % or more and 99 weight % or less in the acrylic components, more preferably 30 weight % or more and 98 weight % or less. When the content of the monofunctional (meth)acrylic based monomers is less than 20 weight %, a problem such as the strength of the film is not sufficient may occur. When the content of the monofunctional (meth)acrylic based monomers is more than 99 weight %, the film may excessively increase rigidity to become brittle.

In the present invention, examples of the monofunctional (meth)acrylic based monomers having Tg of less than 0° C., include n-butyl acrylate, 2-ethylhexyl acrylate, isooctyl acrylate, isobutyl acrylate, 2-methoxyethyl acrylate, tetrahydrofluorofuryl acrylate, phenoxyethyl acrylate, ethoxyethyl acrylate, 3-methoxybutyl acrylate and the like. These monomers can be used alone or as combinations of two or more of them.

In the present invention, as the monofunctional (meth) acrylic based monomers having Tg of less than 0° C. is particularly preferably used n-butyl acrylate.

Although the monofunctional (meth)acrylic based monomer having Tg of less than 0° C. may also be not contained (0 weight % of the content), when it is contained, the content of the monofunctional (meth)acrylic based monomer is preferably more than 0 weight % and 50 weight % or less in the acrylic component, more preferably more than 0 weight % and 45 weight % or less. When the content of the monofunctional (meth)acrylic based monomer is more than 50 weight, a problem sometimes occurs that the strength of the film is not sufficient.

The kind, combination and amount to be used of the (meth) acrylic based monomer can be determined as appropriate taking into consideration compatibility with urethane, polymerizability upon curing with light such as radiation, and characteristics of the resultant high polymer.

In the present invention, together with the above (meth) acrylic based monomer, monomers such as vinyl acetate, vinyl propionate, styrene, acrylamide, methacrylamide, mono- or diester of maleic acid and derivatives thereof, N-methylolacrylamide, glycidyl acrylate, glycidyl methacrylate, N,N-dimethylaminoethyl acrylate, N,N-dimethylaminopropyl methacrylamide, 2-hydroxypropyl acrylate, N,N-dimethylacrylamide, N,N-diethylacrylamide, imide acrylate, N-vinylpyrrolidone, oligoester acrylate, ε-caprolactone acrylate, dicyclopentanyl (meth)acrylate, dicyclopentenyl (meth) acrylate, methoxylated cyclododecatriene acrylate, and methoxyethyl acrylate may be copolymerized. The kind and amount of the copolymerizable monomers can be determined as appropriate taking into consideration the properties of the resultant composite film and so on.

Further, other polyfunctional monomers may be added as far as the characteristics of the present invention are not deteriorated. Examples of such polyfunctional monomer include ethylene glycol di(meth)acrylate, propylene glycol di(meth)acrylate, hexanediol di(meth)acrylate, neopentyl glycol di(meth)acrylate, trimethylolpropane tri(meth)acrylate, pentaerythritol tri(meth)acrylate, dipentaerythritol hexa(meth)acrylate, urethane acrylate, epoxyacrylate, polyester acrylate and the like. Particularly preferably, trimethylolpropane tri(meth)acrylate can be used as polyfunctional monomer.

The polyfunctional monomer can be contained in amounts of 1 parts by weight or more and 20 parts by weight or less based on 100 parts by weight of the acrylic based monomer. When the content of the polyfunctional monomer is 1 parts by weight or more, the cohesive force of the composite film is sufficient, and when the content of the polyfunctional monomer is 20 parts by weight or less, the elastic modulus does not become excessively high, so that the composite film can follow up the unevenness on the surface of the adherend.

The urethane polymer can be obtained by reacting a diol with a diisocyanate. Although the reaction of the hydroxyl groups of diol with the isocyanate can generally be performed with a catalyst, the reaction can be promoted even without a catalyst such as dibutyltin dilaurate and tin octoate, which causes environmental load according to the present invention.

Low molecular weight diols include dihydric alcohols such as ethylene glycol, diethylene glycol, propylene glycol butylene glycol, and hexamethylene glycol.

Examples of the high molecular weight diol include polyether polyols obtained by addition polymerization of ethylene oxide, propylene oxide, tetrahydrofuran or the like; polyester polyols that are condensation products between an alcohol such as the above-mentioned dihydric alcohol, 1,4-butanediol and 1,6-hexanediol, with a dibasic acid such as adipic acid, azelaic acid, or sebacic acid; acrylic polyol, carbonate polyol, epoxy polyol, caprolactone polyol, and the like. Among these, for example, polyoxytetramethylene glycol (PTMG) and polyalkylene carbonate diol (PCD) are preferably used.

Examples of the acrylic polyol include copolymers of hydroxyl group-containing monomers and in addition, copolymers of a hydroxyl group-containing substance and an acrylic based monomer. The epoxy polyols include amine-modified epoxy resins and the like.

In the present invention, the urethane polymer does not contain a crosslinking structure. The diol to be used for forming a urethane polymer is preferably a linear diol. As long as a crosslinking structure does not be formed in urethane polymer, however, the diol may also be a side-chain diol or a diol containing a branched structure. That is, the urethane polymer that constitutes the composite film of the present invention does not contain a crosslinking structure, and accordingly, is structurally totally different from the IPN structure.

In the present invention, the above-mentioned diols can be used alone or in combinations in consideration of solubility to the acrylic based monomer, reactivity with isocyanate, and the like. When strength is required, it is effective to increase the amount of urethane hard segment by use of a low molecular weight diol. When importance is posed on elongation, it is preferable that a diol having a large molecular weight is used singly. The polyether polyols are generally inexpensive and have good water resistance, and the polyester polyols have high strength. In the present invention, the kind and amount of polyol can be selected freely depending on the utility and purpose. The kind and molecular weight, and amount of polyols to be used can be selected as appropriate also from the viewpoints of properties of substrates coated, reactivity with isocyanate and compatibility with the acrylic.

As the diisocyanates, aromatic, aliphatic and alicyclic diisocyanates, and dimers, trimers, and the like of these diisocyanates may be used. Examples of the aromatic, aliphatic and alicyclic diisocyanates include tolylene diisocyanate (TDI), diphenylmethane diisocyanate (MDI), xylylene diisocyanate (XDI), naphthylene diisocyanate (NDI), phenylene diisocyanate (PPDI), m-tetramethyl xylylene diisocyanate (TMXDI), methylcyclohexane diisocyanate (hydrogenated TDI), dicyclohexylmethane diisocyanate (hydrogenated MDI), cyclohexane diisocyanate (hydrogenated PPDI), bis(isocyanatomethyl)cyclohexane (hydrogenated XDI), norbornene diisocyanate (NBDI), isophorone diisocyanate (IPDI), hexamethylene diisocyanate (HDI), butane diisocyanate, 2,4-trimethylhexamethylene diisocyanate, 2,4,4-trimethylhexamethylene diisocyanate, and the like. Also, dimers and trimers of these and polyphenylmethane diisocyanates may be used. The trimers include isocyanurate type, biuret type, allophanate type and the like and can be used appropriately.

Among these, in particular, aliphatic and alicyclic diisocyanates such as methylcyclohexane diisocyanate (hydrogenated TDI), dicyclohexylmethane diisocyanate (hydrogenated MDI), cyclohexane diisocyanate (hydrogenated PPDI), bis(isocyanatomethyl)cyclohexane (hydrogenated XDI), norbornene diisocyanate (NBDI), isophorone diisocyanate (IPDI), hexamethylene diisocyanate (HDI), butane diisocyanate, 2,4-trimethylhexamethylene diisocyanate, and 2,4,4-trimethylhexamethylene diisocyanate are preferably used. This is because, by using aromatic series diisocyanates containing a benzene ring, a colored substances having a conjugated structure is prone to be created due to a photoreaction, and thus they are not preferred. In the present invention, the aliphatic and alicyclic diisocyanates containing no benzene ring which are the poor yellowing type or non-yellowing type are preferably used.

The diisocyanates may be used alone or as combinations. The kind and combination of the diisocyanates may be appropriately selected from the viewpoints of properties of the substrate and the like to which the composite film is applied (is coated), the solubility to the acrylic based monomer, the reactivity with hydroxyl groups.

In the present invention, regarding the amounts of the diol component and the diisocyanate component for forming the urethane polymer, the amount of the diol component to be used to that of the diisocyanate component is such that an NCO/OH (equivalent ratio) is preferably 1.1 or more and 2.0 or less, more preferably 1.15 or more and 1.35 or less. When the NCO/OH (equivalent ratio) is less than 1.1, the film strength tends to decrease. When the NCO/OH (equivalent ratio) is 2.0 or less, the urethane polymer can have a sufficient elongation and flexibility.

A hydroxyl group-containing acrylic monomer may also be added to the above-mentioned urethane polymer. A (meth)acryloyl group can be introduced at the molecular ends of the urethane prepolymer by adding a hydroxyl group-containing acrylic monomer to thereby impart the copolymerizability with the (meth)acrylic based monomer and enhance the compatibility of the urethane component and the acrylic component, and the improvement of S—S properties such as breaking strength can be achieved. As the hydroxyl group-containing acrylic monomer, hydroxyethyl (meth)acrylate, hydroxypropyl (meth)acrylate, hydroxybutyl (meth)acrylate, hydroxyhexyl (meth)acrylate and the like can be used. The amount of the hydroxyl group-containing acrylic monomer to be used is preferably from 0.1 to 10 parts by weight based on 100 parts by weight of the urethane polymer, more preferably from 1 to 5 parts by weight.

In the present invention, an ultraviolet absorber is preferably added to the composite film precursor containing at least a urethane polymer. The composite film precursor is preferably one that contains the urethane polymer and the (meth)

acrylic based monomer. Examples of ultraviolet absorber to be used in the present invention include benzotriazole based ultraviolet absorbers, hydroxyphenyltriazine based ultraviolet absorbers, benzophenone based ultraviolet absorbers, benzoate based ultraviolet absorbers and the like. In the present invention, the benzotriazole based ultraviolet absorbers and/or the hydroxyphenyltriazine based ultraviolet absorbers are preferably.

Examples of benzotriazole based ultraviolet absorbers include 2-(2-hydroxy-5-tert-butylphenyl)-2H-benzotriazole, ester compounds of benzenepropanoic acid and 3-(2H-benzotriazole-2-yl)-5-(1,1-dimethylethyl)-4-hydroxy (side-chain alkyl and linear alkyl of $C_7$-$C_9$), mixtures of octyl-3-[3-tert-butyl-4-hydroxy-5-(5-chloro-2H-benzotriazole-2-yl)phenyl]propionate and 2-ethylhexyl-3-[3-tert-butyl-4-hydroxy-5-(5-chloro-2H-benzotriazole-2-yl)phenyl]propionate, 2-(2H-benzotriazole-2-yl)-4,6-bis(1-methyl-1-phenylethyl)phenol, 2-(2H-benzotriazole-2-yl)-6-(1-methyl-1-phenylethyl)-4-(1,1,3,3-tetramethylbutyl)phenol, reaction products of methyl-3-(3-(2H-benzotriazole-2-yl)-5-tert-butyl-4-hydroxyphenyl)propionate/polyethylene glycol 300, 2-(2H-benzotriazole-2-yl)-p-cresol, 2-[5-chloro(2H)-benzotriazole-2-yl]-4-methyl-6-(tert-butyl)phenol, 2-(2H-benzotriazole-2-yl)-4,6-di-tert-pentylphenol, 2-(2H-benzotriazole-2-yl)-4-(1,1,3,3-tetramethylbutyl)phenol, 2-2'-methylenebis[6-(2H-benzotriazole-2-yl)-4-(1,1,3,3-tetramethylbutyl)phenol], reaction products of methyl-3-(3-(2H-benzotriazole-2-yl)-5-tert-butyl-4-hydroxyphenyl) propionate and polyethylene glycol 300, 2-(2H-benzotriazole-2-yl)-6-dodecyl-4-methylphenol, 2-[2-hydroxy-3-(3,4,5,6-tetrahydrophthalimide-methyl)-5-methylphenyl]benzotriazole, 2,2'-methylenebis[6-(benzotriazole-2-yl)-4-tert-octylphenol], and the like.

Examples of hydroxyphenyltriazine based ultraviolet absorber include reaction products of 2-(4,6-bis(2,4-dimethylphenyl)-1,3,5-triazine-2-yl)-5-hydroxyphenyl and [($C_{10}$-$C_{16}$, mainly $C_{12}$-$C_{13}$ alkyloxy)methyl]oxirane, reaction products of 2-(2,4-dihydroxyphenyl)-4,6-bis-(2,4-dimethylphenyl)-1,3,5-triazine and (2-ethylhexyl)-glycidic acid ester, 2,4-bis[2-hydroxy-4-butoxyphenyl]-6-(2,4-dibutoxyphenyl)-1,3,5-triazine, 2-(4,6-diphenyl-1,3,5-triazine-2-yl)-5-[(hexyl)oxy]-phenol, 2-(2-hydroxy-4-[1-octyloxycarbonylethoxy]phenyl)-4,6-bis (4-phenylphenyl)-1,3,5-triazine, and the like.

Examples of benzophenone based ultraviolet absorber include 2-hydroxy-4-n-octyloxybenzophenone and the like.

Examples of benzoate based ultraviolet absorber include 2,4-di-tert-butylphenyl-3,5-di-tert-butyl-4-hydroxybenzoate (TINUVIN 120), and the like.

Examples of the benzotriazole based ultraviolet absorbers that are commercially available include "TINUVIN PS" manufactured by Ciba Japan K.K. as 2-(2-hydroxy-5-tert-butylphenyl)-2H-benzotriazole, "TINUVIN 384-2" manufactured by Ciba Japan K.K. as an ester compound of benzenepropanoic acid and 3-(2H-benzotriazole-2-yl)-5-(1,1-dimethylethyl)-4-hydroxy (side-chain alkyl and linear alkyl of $C_7$-$C_9$), "TINUVIN 109" manufactured by Ciba Japan K.K. as a mixture of octyl-3-[3-tert-butyl-4-hydroxy-5-(5-chloro-2H-benzotriazole-2-yl)phenyl]propionate and 2-ethylhexyl-3-[3-tert-butyl-4-hydroxy-5-(5-chloro-2H-benzotriazole-2-yl)phenyl]propionate, "TINUVIN 900" manufactured by Ciba Japan K.K. as 2-(2H-benzotriazole-2-yl)-4,6-bis(1-methyl-1-phenylethyl)phenol, "TINUVIN 928" manufactured by Ciba Japan K.K. as 2-(2H-benzotriazole-2-yl)-6-(1-methyl-1-phenylethyl)-4-(1,1,3,3-tetramethylbutyl)phenol, "TINUVIN 1130" manufactured by Ciba Japan K.K. as a reaction product of methyl-3-(3-(2H-benzotriazole-2-yl)-5-tert-butyl-4-hydroxyphenyl)propionate/polyethylene glycol 300, "TINUVIN P" manufactured by Ciba Japan K.K. as 2-(2H-benzotriazole-2-yl)-p-cresol, "TINUVIN 326" manufactured by Ciba Japan K.K. as 2-[5-chloro(2H)-benzotriazole-2-yl]-4-methyl-6-(tert-butyl)phenol, "TINUVIN 328" manufactured by Ciba Japan K.K. as 2-(2H-benzotriazole-2-yl)-4,6-di-tert-pentylphenol, "TINUVIN 329" manufactured by Ciba Japan K.K. as 2-(2H-benzotriazole-2-yl)-4-(1,1,3,3-tetramethylbutyl)phenol, "TINUVIN 360" manufactured by Ciba Japan K.K. as 2-2'-methylenebis[6-(2H-benzotriazole-2-yl)-4-(1,1,3,3-tetramethylbutyl)phenol], "TINUVIN 213" manufactured by Ciba Japan K.K. as a reaction product of methyl-3-(3-(2H-benzotriazole-2-yl)-5-tert-butyl-4-hydroxyphenyl)propionate and polyethylene glycol 300, "TINUVIN 571" manufactured by Ciba Japan K.K. as 2-(2H-benzotriazole-2-yl)-6-dodecyl-4-methylphenol, "Sumisorb 250" manufactured by Sumitomo Chemical Co., Ltd. as 2-[2-hydroxy-3-(3,4,5,6-tetrahydrophthalimide-methyl)-5-methylphenyl]benzotriazole, "ADKSTAB LA31" manufactured by ADEKA Corporation as 2,2'-methylenebis[6-(benzotriazole-2-yl)-4-tert-octylphenol], and the like.

Examples of hydroxyphenyltriazine based ultraviolet absorbers that are commercially available include "TINUVIN 400" manufactured by Ciba Japan K.K. as a reaction product of 2-(4,6-bis(2,4-dimethylphenyl)-1,3,5-triazine-2-yl)-5-hydroxyphenyl and [($C_{10}$-$C_{16}$ mainly $C_{12}$-$C_{13}$ alkyloxy)methyl]oxirane, "TINUVIN 405" manufactured by Ciba Japan K.K. as a reaction product of 2-(2,4-dihydroxyphenyl)-4,6-bis-(2,4-dimethylphenyl)-1,3,5-triazine and (2-ethylhexyl)-glycidic acid ester, "TINUVIN 460" manufactured by Ciba Japan K.K. as 2,4-bis[2-hydroxy-4-butoxyphenyl]-6-(2,4-dibutoxyphenyl)-1,3,5-triazine, "TINUVIN 1577" manufactured by Ciba Japan K.K. as 2-(4,6-diphenyl-1,3,5-triazine-2-yl)-5-[(hexyl)oxy]-phenol, "TINUVIN 479" manufactured by Ciba Japan K.K. as 2-(2-hydroxy-4-[1-octyloxycarbonylethoxy]phenyl)-4,6-bis (4-phenylphenyl)-1,3,5-triazine, and the like.

Examples of benzoate based ultraviolet absorbers that are commercially available include "TINUVIN 120" manufactured by Ciba Japan K.K. as 2,4-di-tert-butylphenyl-3,5-di-tert-butyl-4-hydroxybenzoate, and the like.

In the present invention, the above-mentioned ultraviolet absorbers can be used alone or as combinations of two or more of them.

A total amount of the ultraviolet absorbers is preferably 0.1 weight % or more and 4.0 weight % or less based on 100 weight % of the composite film precursor, more preferably 0.5 weight % or more and 2.0 weight % or less. When the content of the ultraviolet absorbers is 0.1 weight % or more, ultraviolet light that causes deterioration and coloring is sufficiently absorbed. When the content is 4.0 weight % or less, coloring does not occur due to the ultraviolet absorbers themselves.

The film may be colored in some cases. In the present invention, "coloring" includes, for example, coloring immediately after a film formation, coloring of the formed film generated by external factors such as sunlight. The coloring immediately after a film formation is caused by main components of the materials used to form the film or additives added to the materials, and is the initial coloring in the film. The coloring generated by external factors such as sunlight, is one that occurs because of a change in chemical composition of the film caused by external factors, and is a discoloration of the film. The coloring in the film can be indicated as, for example, a b* value. The b* value can be measured by using a multi-angle spectrocolorimeter. The composite film of the present invention preferably has the b* value (value at an angle of 15 degrees) of 4.0 or less, more preferably the b* value of 3.5 or less. When the b* value is more than 4.0, the color difference between the composite film and an adherend becomes larger when the composite film is applied to the adherend such as a white painted board, and the appearance may be damaged. When the b* value is 4.0 or less, a good appearance can be ensured sufficiently. Note that the composite film of the present invention has both an initial b* value and a b* value after an accelerated weathering test for 120 hours (described later in Examples) of 4.0 or less.

The composite film of the present invention has preferably a b* value after an accelerated weathering test for 240 hours (value at an angle of 15 degrees) measured by a spectrocolorimeter of 4.0 or less.

In the present invention, it is preferable that a light stabilizer is added to the composite film precursor containing at least the urethane polymer. The light stabilizer that can be used in the present invention must be a hindered amine based light stabilizer (HALS). Preferably examples of the hindered amine based light stabilizer include the compounds represented by the following formula (III).

[compound 7]

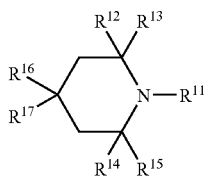

(III)

wherein $R^{11}$ represents an alkylene group, an alkyl group, or an ether group, and $R^{12}$, $R^{13}$, $R^{14}$, $R^{15}$, $R^{16}$, and $R^{17}$ each independently represent a hydrogen atom, alternatively an alkyl group or an alkoxy group that may be substituted.

Examples of the hindered amine light stabilizers that are commercially available include "TINUVIN 622" (manufactured by Ciba Japan K.K.) as a light stabilizer being a polymerized product of dimethyl succinate and 4-hydroxy-2,2,6, 6-tetramethyl-1-piperidineethanol, "TINUVIN 119" (manufactured by Ciba Japan K.K.) as a light stabilizer being a one-on-one reaction product of N,N',N",N"'-tetrakis-(4,6-bis-(butyl-(N-methyl-2,2,6,6-tetramethylpiperidine-4-yl) amino)-triazine-2-yl)-4,7-diazadecane-1,10-diamine and a polymerized product of dimethyl succinate and 4-hydroxy-2, 2,6,6-tetramethyl-1-piperidineethanol, "TINUVIN 2020" (manufactured by Ciba Japan K.K.) as a light stabilizer being a polycondensation product of dibutylamine 1,3-triazine N,N'-bis(2,2,6,6-tetramethyl-4-piperidyl-1,6-hexamethylenediamine) and N-(2,2,6,6-tetramethyl-4-piperidyl)butylamine, "TINUVIN 944" (manufactured by Ciba Japan K.K.) as a light stabilizer being poly[{6-(1,1,3,3-tetramethylbutyl) amino-1,3,5-triazine-2,4-diyl}{2,2,6,6-tetramethyl-4-piperidyl}imino]hexamethylene {(2,6,6-tetramethyl-4-piperidyl)imino}, "TINUVIN 765" (manufactured by Ciba Japan K.K.) as a light stabilizer being a mixture of bis(1,2,2, 6,6-pentamethyl-4-piperidyl)sebacate and methyl 1,2,2,6,6-pentamethyl-4-piperidyl sebacate, "TINUVIN 770" (manufactured by Ciba Japan K. K.) as a light stabilizer being bis(2,2,6,6-tetramethyl-4-piperidyl)sebacate, "TINUVIN 123" (manufactured by Ciba Japan K.K.) as a light stabilizer being a reaction product of decanedioic acid bis(2,2,6,6-tetramethyl-1-(octyloxy)-4-piperidinyl) ester (1,1-dimethylethyl hydroperoxide) and octane, "TINUVIN 144" (manufactured by Ciba Japan K.K.) as a light stabilizer being bis(1, 2,2,6,6-pentamethyl-4-piperidyl) [[3,5-bis(1,1-dimethylethyl)-4-hydroxyphenyl]methyl]butylmalonate, "TINUVIN 152" (manufactured by Ciba Japan K.K.) as a light stabilizer being a reaction product of 2-aminoethanol and a reaction product of cyclohexane and N-butyl peroxide-2,2,6,6-tetramethyl-4-piperidineamine-2,4,6-trichloro-1,3, 5-triazine, "TINUVIN 292" (manufactured by Ciba Japan K.K.) as a light stabilizer being a mixture of bis(1,2,2,6,6-pentamethyl-4-piperidyl)sebacate and methyl-1,2,2,6,6-pentamethyl-4-piperidyl sebacate, and the like.

In the present invention, the above-mentioned hindered amine light stabilizers can be used alone or as combinations of two or more of them. A total amount of these hindered amine light stabilizers is preferably 0.1 weight % or more and 4.0 weight % or less based on 100 weight % of the composite film precursor, and more preferably 0.5 weight % or more and 2.0 weight % or less. When the amount of the hindered amine light stabilizers is 0.1 weight % or more, the function of deterioration prevention is exhibited sufficiently, and when it is 4.0 weight % or less, coloring caused by the light stabilizers themselves does not occur.

In the present invention, an acylphosphine based photopolymerization initiator is added to the composite film precursor containing at least a urethane polymer. The composite film precursor is preferably obtained by using the urethane polymer and the acryl based monomer. The acylphosphine based photopolymerization initiator that can be used in the present invention has preferred at least one of monoacylphosphine oxide having a structure represented by the following formula (I) and/or at least one of diacylphosphine oxide having a structure represented by the following formula (II).

The formula (I) is shown below.

[compound 8]

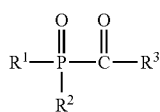

(I)

[In the formula (I), $R^1$ represents an alkyl group of $C_1$-$C_{18}$; an alkyl group of $C_1$-$C_4$ substituted by halogen or an alkoxy group of $C_1$-$C_6$, a cycloalkyl group of $C_5$-$C_8$, a phenylalkyl group of $C_7$-$C_9$, a phenyl group, a naphthyl group, or a biphenyl group; a phenyl group, a naphthyl group, or a biphenyl group, substituted by at least one selected from the group consisting of halogen, an alkyl group of $C_1$-$C_{12}$ and an alkoxy group of $C_1$-$C_{12}$; or a five-membered or six-membered heterocyclic group containing a monovalent N, O, or S. $R^2$ represents a phenyl group, a naphthyl group, or a biphenyl group; a phenyl group, a naphthyl group, or a biphenyl group, substituted by at least one selected from the group consisting of halogen, an alkyl group of $C_1$-$C_{12}$, and an alkoxy group of $C_1$-$C_{12}$; a five-membered or six-membered heterocyclic group containing a monovalent N, O, or S, an alkoxy group of $C_1$-$C_{18}$, or a phenoxy group; a phenoxy group, a benzyloxy group, or a cyclohexyloxy group, substituted by halogen, an alkyl group of $C_1$-$C_4$, or an alkoxy group of $C_1$-$C_4$; or $R^2$ and $R^1$ form a ring together with a phosphorus atom; $R^3$ represents an alkyl group of $C_1$-$C_{18}$; an alkyl group of $C_1$-$C_4$, a cycloalkyl group of $C_5$-$C_8$, a phenylalkyl group of $C_7$-$C_9$, a phenyl group, a naphthyl group, or a biphenyl group, substituted by halogen or an alkoxy group of $C_1$-$C_6$; a phenyl group, a naphthyl group, or a biphenyl group, substituted by at least one selected from the group consisting of halogen, an alkyl group of $C_1$-$C_{12}$, and an alkoxy group of $C_1$-$C_{12}$; a five-membered or six-membered heterocyclic group containing a monovalent N, O, or S; or a group represented by the following formula:

[compound 9]

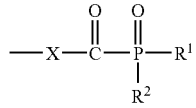

wherein, X represents an alkylene group or a cyclohexylene group; or a phenylene group or a biphenylene group, unsubstituted or substituted by at least one selected from the group consisting of halogen, an alkyl group of $C_1$-$C_4$ and an alkoxy group of $C_1$-$C_4$.]

The formula (II) is shown below.

[compound 10]

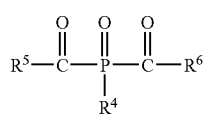
(II)

[In the formula (II), $R^4$ represents an alkyl group of $C_1$-$C_{18}$; an alkyl group of $C_1$-$C_4$, a cycloalkyl group of $C_5$-$C_8$, a phenylalkyl group of $C_7$-$C_9$, a phenyl group, a naphthyl group, or a biphenyl group, substituted by halogen or an alkoxy group of $C_1$-$C_6$; a phenyl group, a naphthyl group, or a biphenyl group, substituted by at least one selected from the group consisting of halogen, an alkyl group of $C_1$-$C_{12}$ and an alkoxy group of $C_1$-$C_{12}$; or a five-membered or six-membered heterocyclic group containing a monovalent N, O, or S, an alkoxy group of $C_1$-$C_{18}$, or a phenoxy group; or a phenoxy group, a benzyloxy group, a cyclohexyloxy group, substituted by halogen, an alkyl group of $C_1$-$C_4$, or an alkoxy group of $C_1$-$C_4$; and $R^5$ and $R^6$, independently from each other, represent an alkyl group of $C_1$-$C_{18}$; an alkyl group of $C_1$-$C_4$, a cycloalkyl group of $C_5$-$C_8$, a phenylalkyl group of $C_7$-$C_9$, a phenyl group, a naphthyl group, or a biphenyl group, substituted by halogen or an alkoxy group of $C_1$-$C_6$; a phenyl group, a naphthyl group, or a biphenyl group, substituted by at least one selected from the group consisting of halogen, an alkyl group of $C_1$-$C_{12}$ and an alkoxy group of $C_1$-$C_{12}$; or a five-membered or six-membered heterocyclic group containing a monovalent N, O or S.]

$R^1$ in the formula (I) preferably represents a phenyl group, or a phenyl group substituted by one or more selected from the group consisting of halogen, an alkyl group of $C_1$-$C_{12}$ and an alkoxy group of $C_1$-$C_{12}$.

More preferably, $R^1$ represents a phenyl group; or a phenyl group substituted by one to three of an alkyl group of $C_1$-$C_4$, particularly preferably $R^1$ represents a phenyl group.

$R^2$ in the formula (I) represents preferably a phenyl group or a phenoxy group; a phenyl group or a phenoxy group substituted by one or more selected from the group consisting of halogen, an alkyl group of $C_1$-$C_{12}$, or an alkoxy group of $C_1$-$C_{12}$; or an alkoxy group of $C_1$-$C_{18}$.

More preferably, $R^2$ represents a phenyl group or a phenoxy group; or a phenyl group or a phenoxy group, substituted by one to three of alkyl groups, in particular methyl groups; or an alkoxy group of $C_1$-$C_8$.

Particularly preferably, $R^2$ represents an alkoxy group of $C_1$-$C_8$, in particular an alkoxy group of $C_1$-$C_4$.

$R^3$ represents preferably a phenyl group; or a phenyl group substituted by one or more selected from the group consisting of halogen, an alkyl group of $C_1$-$C_{12}$, and an alkoxy group of $C_1$-$C_{12}$.

More preferably, $R^3$ represents a phenyl group substituted at least at positions 2 and 6, at positions 2 and 4, or at positions 2, 4 and 6 (based on the carbonyl group) by an alkyl group of $C_1$-$C_8$, preferably by an alkyl group of $C_1$-$C_3$, particularly a methyl group.

Particularly preferably, $R^3$ represents a 2,4-dimethylphenyl group or a 2,4,6-trimethylphenyl group.

$R^4$ in the formula (II) represents preferably a phenyl group or a phenoxy group; a phenyl group or a phenoxy group substituted by one or more selected from the group consisting of halogen, an alkyl group of $C_1$-$C_{12}$, and an alkoxy group of $C_1$-$C_{12}$; or an alkoxy group of $C_1$-$C_{18}$ or an alkyl group of $C_1$-$C_{18}$.

More preferably, $R^4$ represents a phenyl group or a phenoxy group; or a phenyl group substituted by an alkyl group of $C_1$-$C_4$, and the alkyl group represents preferably a methyl group. Particularly preferably, $R^4$ represents a phenyl group.

$R^5$ and $R^6$ in the formula (II), independently from each other, represents preferably a phenyl group; or a phenyl group substituted by one or more selected from the group consisting of halogen, an alkyl group of $C_1$-$C_{12}$, or an alkoxy group of $C_1$-$C_{12}$.

More preferably, $R^5$ and $R^6$, independently from each other, represents a phenyl group substituted at positions 2 and 6, at positions 2 and 4, or at positions 2, 4 and 6 (based on the carbonyl group) by an alkoxy group of $C_1$-$C_8$ or alkyl group of $C_1$-$C_8$, preferably an alkoxy group of $C_1$-$C_4$ or alkyl group of $C_1$-$C_4$, in particular a methyl group.

Particularly preferably, $R^5$ and $R^6$ represent a 2,4-dimethylphenyl group, in particular a 2,4,6-trimethylphenyl group.

Examples of the acylphosphine based photopolymerization initiator that can be used in the present invention include bis(2,6-dimethoxybenzoyl)phenylphosphine oxide, bis(2,6-dimethoxybenzoyl)(2,4,4-trimethylpentyl)phosphine oxide, bis(2,6-dimethoxybenzoyl)-n-butylphosphine oxide, bis(2,6-dimethoxybenzoyl)-(2-methylpropane-1-yl)phosphine oxide, bis(2,6-dimethoxybenzoyl)-(1-methylpropane-1-yl) phosphine oxide, bis(2,6-dimethoxybenzoyl)-t-butylphosphine oxide, bis(2,6-dimethoxybenzoyl)cyclohexylphosphine oxide, bis(2,6-dimethoxybenzoyl)octylphosphine oxide, bis(2-methoxybenzoyl)(2-methylpropane-1-yl)phosphine oxide, bis(2-methoxybenzoyl)(1-methylpropane-1-yl) phosphine oxide, bis(2,6-diethoxybenzoyl)(2-methylpropane-1-yl)phosphine oxide, bis(2,6-diethoxybenzoyl)(1-methylpropane-1-yl)phosphine oxide, bis(2,6-dibutoxybenzoyl)(2-methylpropane-1-yl)phosphine oxide, bis(2,4-dimethoxybenzoyl)(2-methylpropane-1-yl)phosphine oxide, bis(2,4,6-trimethylbenzoyl)(2,4-dipentoxyphenyl)phosphine oxide, bis(2,6-dimethoxybenzoyl)benzylphosphine oxide, bis(2,6-dimethoxybenzoyl)-2-phenylpropylphosphine oxide, bis(2,6-dimethoxybenzoyl)-2-phenylethylphosphine oxide, bis(2,6-dimethoxybenzoyl) benzylphosphine oxide, bis(2,6-dimethoxybenzoyl)-2-phenylpropylphosphine oxide, bis(2,6-dimethoxybenzoyl)-2-phenylethylphosphine oxide, 2,6-dimethoxybenzoyl benzylbutylphosphine oxide, 2,6-dimethoxybenzoyl benzyloctylphosphine oxide, bis(2,4,6-trimethylbenzoyl)-2,5-diisopropylphenylphosphine oxide, bis(2,4,6-trimethylbenzoyl)-2-methylphenylphosphine oxide, bis(2,4,6- trimethylbenzoyl)-4-methylphenylphosphine oxide, bis(2,4,6-trimethylbenzoyl)-2,5-diethylphenylphosphine oxide, bis(2,4,6-trimethylbenzoyl)-2,3,5,6-tetramethylphenylphosphine oxide, bis(2,4,6-trimethylbenzoyl)-2,4-di-n-butoxyphenylphosphine oxide, 2,4,6-trimethylbenzoyl diphenylphosphine oxide, bis(2,6-dimethoxybenzoyl)-2,4,4-trimethylpentylphosphine oxide, bis(2,4,6-trimethylbenzoyl)isobutylphosphine oxide, 2,6-dimethoxybenzoyl-2,4,6-trimethylbenzoyl-n-butylphosphine oxide, bis(2,4,6-trimethylbenzoyl)phenylphosphine oxide, bis(2,4,6-trimethylbenzoyl)-2,4-dibutoxyphenylphosphine oxide, 1,10-bis[bis(2,4,6-trimethylbenzoyl)phosphine oxide]decane, tri(2-methylbenzoyl)phosphine oxide, and the like.

Among them, bis(2,4,6-trimethylbenzoyl)phenylphosphine oxide, bis(2,4,6-trimethylbenzoyl)-2,4-di-n-butoxyphenylphosphine oxide, 2,4,6-trimethylbenzoyl diphenylphosphine oxide, and bis(2,6-dimethoxybenzoyl)-2,4,4-trimethylpentylphosphine oxide are preferred in particularly.

In the present invention, an alkylphenone based photopolymerization initiator can also be used in combination with the acylphosphine based photopolymerization initiator. Examples of the alkylphenone based photopolymerization initiator include α-hydroxyalkylphenone and the like. By using α-hydroxyalkylphenone in combination, the rate of polymerization can be improved.

Examples of the α-hydroxyalkylphenone based photopolymerization initiator that can be used in the present invention include 1-hydroxy-cyclohexyl-phenylketone, 2-hydroxy-2-methyl-1-phenyl-propane-1-one, 1-(4-isopropylphenyl)-2-hydroxy-2-methyl-propane-1-one, 1-[4-(2-hydroxyethoxy)phenyl]-2-hydroxy-2-methyl-propane-1-one, and the like.

Examples of the acylphosphine based photopolymerization initiators that are commercially available include "DAROCUR TPO" (produced by Ciba Japan K.K.) as 2,4,6-trimethylbenzoyl-diphenyl-phosphine oxide, "IRGACURE 819" (manufactured by Ciba Japan K.K.) as bis(2,4,6-trimethylbenzoyl)-phenylphosphine oxide, and the like. Examples of the alkylphenone based photopolymerization initiators that are commercially available include "IRGACURE 184" (manufactured by Ciba Japan K.K.) as α-hydroxyalkylphenone and the like. In addition, examples of the photopolymerization initiators in which an acylphosphine based photopolymerization initiator and an alkylphenone based photopolymerization initiator are premixed, include "IRGACURE 1850" (manufactured by Ciba Japan K.K.) which mixes bis(2,6-dimethoxybenzoyl)-2,4,4-trimethylpentylphosphine oxide and 1-hydroxy-cyclohexyl-phenylketone, and can be also used in the present invention.

In the present invention, the acylphosphine based photopolymerization initiators can be used alone or as combination of two or more of them. The total amount of these acylphosphine based photopolymerization initiators is preferably 0.05 weight % or more and 4.0 weight % or less based on the acrylic component, more preferably 0.1 weight % or more and 2.0 weight % or less. When the amount of the acylphosphine based photopolymerization initiators is 0.05 weight % or more, the composite film has a sufficient curing property, and when the amount is 4.0 weight % or less, the initial coloring in the composite film due to a residue of the undecomposed initiators decreases.

In the present invention, the curing property can be indicated by a ratio of the non-volatile component after irradiating a mixture in which an ultraviolet absorber and the like are added to the composite film precursor containing at least a urethane polymer, for example a composite film precursor containing a urethane polymer and a (meth)acrylic based monomer, with radiation in a photosensitive wavelength range of the photopolymerization initiator, for curing, that is, by a polymerization ratio. The non-volatile component (in %) can be obtained as below, for example.

That is, a weight (W1) of a composite film after curing (a cast film, a separator or the like is removed, as needed) is measured. Subsequently, the composite film after measuring the weight is heat-treated at 130° C. for two hours to remove the unreacted (meth)acrylic based monomers. A weight (W2) of the composite film after heat treatment is measured. Then, the non-volatile component (%) is obtained according to the following equation.

Non-Volatile Component(%)=Polymerization Ratio (%)=(Weight after Heat Treatment($W2$))/(Weight before Heat Treatment($W1$))×100

The non-volatile component (polymerization ratio) of the composite film is preferably 96% or more, more preferably 97% or more. When the non-volatile component (polymerization ratio) is less than 96%, the amount of the unreacted component remaining is large, so that an odor may be troubles or the strength of the resulting composite film may not be sufficient. When the non-volatile component (polymerization ratio) is 96% or more, the monomers are sufficiently reacted, so that the composite film has low odor and the strength of the composite film is sufficiently high.

The composite film of the present invention is a composite film containing at least a urethane polymer and, for example, is a composite film containing a (meth)acrylic based polymer and a urethane polymer, and further containing at least one of ultraviolet absorber and at least one of hindered amine light stabilizer. In the composite film, both the initial b* value measured by a spectrocolorimeter (value at an angle of 15 degrees) and a b* value after performing an accelerated weathering test for 120 hours (value at an angle of 15 degrees) are 4.0 or less, and a non-volatile component (polymerization ratio) after heating at 130° C. for two hours is 96% or more.

The composite film may contain generally used additives, for example, antioxidants, fillers, pigments, colorants, flame retardants, antistatic agents, as necessary as far as effects of the present invention are not deteriorated. These additives may be used in amounts that are usually used depending on their kind. These additives may be added in advance prior to the polymerization reaction of a diisocyanate and a diol. Alternatively, they may be added prior to polymerization of a urethane polymer with a (meth)acrylic based monomer.

To adjust the viscosity upon coating, the composite film may contain a small amount of a solvent. The solvent may be selected appropriately from commonly used solvents. Examples of such a solvent include ethyl acetate, toluene, chloroform, dimethylformamide.

When the composite film of the present invention contains a (meth)acrylic based polymer and a urethane polymer, for example, a reaction of a diol with a diisocyanate in a (meth)acrylic based monomer as a diluent is performed to form a urethane polymer and then form a composite film precursor containing the (meth)acrylic based monomer and the urethane polymer as main components. Subsequently, to the composite film precursor are added at least one of ultraviolet absorber and at least one of hindered amine light stabilizer, and further at least one of acylphosphine based photopolymerization initiator as needed, to form a mixture (precursor mixture).

The composite film can be formed by coating the precursor mixture on a base (release-treated as needed), and curing it by irradiating with a light in a photosensitive wavelength range of the photopolymerization initiator depending on the kind of the used photopolymerization initiator, and then peeling and removing the base. Alternatively, a composite film can also be obtained in the form of being laminated on the base and the like without removing the base. Note that a cast film is included in the base in the present invention.

Specifically, after the diol is dissolved in the (meth)acrylic based monomer, the diisocyanate or the like is added to allow it to react with the diol to adjust the viscosity, and to this mixture, an ultraviolet absorber, a hindered amine light stabilizer, and as needed, an acylphosphine based photopolymerization initiator and the like are further added, and a resultant mixture (precursor mixture) is coated on the base and the like, or on a release-treated surface of the base as needed, and curing the coating by using a low-pressure mercury lamp or the like to provide a composite film. In this method, the (meth)acrylic based monomer may be added at one time during the urethane synthesis or in several times dividedly. Alternatively, the diisocyanate is dissolved in the (meth)acrylic based monomer, and then the diol may be reacted with the resultant. According to this method, the molecular weight may not be limited and polyurethanes having high molecular weight can be produced. So, the molecular weight of the finally obtained polyurethane can be designed to a desired size.

In this case, to avoid inhibition of polymerization by oxygen, a release-treated sheet (separator and the like) can be placed on the precursor mixture coated on the base to shut out oxygen. Also, the base may be placed in a vessel filled with an inert gas to decrease the concentration of oxygen.

In the present invention, the kind of radiation or the like and the kind of the lamp to be used for irradiation may be selected appropriately, and low-pressure lamps such as a fluorescent chemical lamp, a black light and a bactericidal lamp as well as high-pressure lamps such as a metal halide lamp and a high-pressure mercury lamp can be used.

The dose of ultraviolet rays or the like may be set up optionally depending on the characteristics required for the film. Generally, the dose of ultraviolet rays is selected within the range of 100 to 5,000 mJ/cm$^2$, preferably 1,000 to 4,000 mJ/cm$^2$, and more preferably 2,000 to 3,000 mJ/cm$^2$. When the dose of ultraviolet rays is less than 100 mJ/cm$^2$, sufficient degree of polymerization may not be obtained, while a dose of ultraviolet ray being more than 5,000 mJ/cm$^2$ may cause deterioration of the characteristic of the composite film.

Further, the temperature at which ultraviolet ray or the like is irradiated is not particularly limited and can be set optionally. However, when the temperature is too high, termination reaction tends to occur due to the heat of polymerization and thus cause a reduction in the characteristics of the film. Usually, the temperature is 70° C. or less, preferably 50° C. or less, and more preferably 30° C. or less.

The thickness of the composite film of the present invention can be selected appropriately depending on the purpose and the like. For example, when the pressure-sensitive adhesive sheet is used as chipping for protecting a body of automobile, the thickness of the composite film is preferably 50 to 500 μm approximately, more preferably 100 to 300 μm approximately.

The composite film of the present invention may be used as is, alternatively it can also be made into an adhesive sheet by forming an adhesive layer on one surface or both surfaces of the composite film. The composition of pressure-sensitive adhesive is not particularly limited and those generally used pressure-sensitive adhesives such as acrylic-based pressure-sensitive adhesives and rubber-based pressure-sensitive adhesives can be used. The method for forming the adhesive layer is not particularly limited. The adhesive layer can be obtained according as a method of directly applying a solvent-based or emulsion-based adhesive on the composite film and being dried, a method of applying such an adhesive on a release paper to form an adhesive layer in advance and then laminating the adhesive layer on the composite film and the like. A method for forming the adhesive layer can also be a method of applying a radiation curing type adhesive on the composite film and curing the composite film and the adhesive layer at the same time by irradiating both them with radiation. Further, in this case, the adhesive layer and the composite film can also be applied so as to be a multilayer construction. Alternatively, the adhesive layer may also be applied on the separator, and then the composite film may be formed on the adhesive layer.

The thickness of the adhesive layer is not particularly limited and can be determined optionally. Usually, the thickness of the adhesive layer is preferably 3 to 100 μm, more preferably 10 to 50 μm, particularly preferably about 10 to 30 μm.

Examples of the material constituting the base that can be used in the present invention include polyester based resins such as polyethylene terephthalate (PET) and polubutylene terephthalate (PBT); polyolefine based resins such as polyethylene (PE), polypropylene (PP), high-density polyethylene, and biaxially oriented polypropylene; thermoplastic resins such as polyimide (PI), polyether ether ketone (PEEK), polyvinyl chloride (PVC), polyvinylidene chloride based resins, polyamide based resins, polyurethane based resins, polystyrene based resins, acrylic based resins, fluorine-contained based resins, cellulose based resins, and polycarbonate based resins; and in addition thermosetting resins and the like. Among them, PET is preferably used since it has suitable hardness when used in processing high precision parts and further it is advantageous from the viewpoints of a variety of kinds and low price. It is preferable that the material of the film is determined appropriately depending on the kind of the adhesive layer to be provided according to the purpose and necessity. For example, when an ultraviolet ray-curing type adhesive is provided, a base having a high ultraviolet transmission is preferable.

In the present invention, other film may be laminated on one or both surfaces of the composite film. Examples of a material forming the other film include polyester based resins such as polyethylene terephthalate (PET); polyolefine based resins such as polyethylene (PE) and polypropylene (PP); thermoplastic resins such as polyimide (PI), polyether ether ketone (PEEK), polyvinyl chloride (PVC), polyvinylidene chloride based resins, polyamide based resins, polyurethane based resins, polystyrene based resins, acrylic based resins, fluorine-contained based resins, cellulose based resins, and polycarbonate based resins; and in addition thermosetting resins and the like. Further, the other film may be of a single layer structure or may be of a multi-layer structure with a plurality of layers made of the same or different materials.

A coat layer may be applied on one or both surfaces of the composite film of this invention. The material for forming the coat layer is not particularly limited. As the materials can be used the general-used ones which include resins such as (meth)acrylate based resin, urethane based resin, urethane acrylate based resin, silicone based resin, fluorine compound based resin, polyolefine based resin, polycarbonate based resin; metal deposition products; or the like. The coat layer is preferably obtained by using a fluorine compound based resin in particular, for example, is preferably a fluoroethylene vinyl ether layer. By applying the coat layer, properties such as a surface gloss property, abrasion resistance, an antifouling property, and water reppelency can be imparted to the composite film, and also the effect of suppressing the deterioration of the composite film itself can be ensured.

The method for forming the coat layer is not particularly limited. The coat layer can be obtained according as, for example, a method of directly applying a solvent-based or emulsion-based coat-agent on the composite film and being dried, a method of applying the coat agent on a release paper to form a coat layer in advance and then transferring the coat layer to the composite film by thermocompression bonding method and the like, a method for forming a coat layer on a release-treated film in advance and then forming the composite film on the coat layer by curing, a method for forming a coat layer on a release-treated film by using a radiation curing type coat-agent in advance and then transferring the coat layer to the composite film, a method of applying a radiation curing type coat-agent on one surface of the composite film and applying a radiation curing type adhesive on the other surface thereof and then being irradiated with radiation, preferably from both surfaces of the composite film, to cure the coat layer and the adhesive layer at the same time, a method for forming a coat layer by depositing a metallic oxide on the composite film, and the like.

When the coat layer is provided on the composite film, the composite film has preferably the coat layer on one surface and the adhesive layer on the other surface thereof.

The thickness of the coat layer is preferably 2 to 50 μm, more preferably 5 to 40 μm, and even more preferably 8 to 30 μm. When the thickness of the coat layer is less than 2 μm, a defect portion is prone to be generated in which the coating layer is not formed, such as a pinhole, and the characteristics of the coat layer may not be exhibited sufficiently. When the thickness of the coat layer is more than 50 μm, the physical properties of the coat layer may cause a reduction in the properties of the composite film.

The composite film of the present invention can have both high strength and high breaking extention, and also excellent flexibility to curved surfaces. Accordingly, the composite film is preferred used as a protective sheet for protecting painted surfaces of an automobile and an aircraft, for example, the composite film may be applied on adhesive coated on an adherend such as a painted surface of an automobile or a building. Alternatively, the composite film can also be used as an adhesive sheet having an adhesive layer on the composite film, and in this case, the adhesive sheet is preferably used as a chipping sheet for applying on an automobile body and the like. Moreover, the composite film of the present invention has excellent weathering resistance and hence does not undergo yellowing or deterioration in gloss even after being left outdoors for a long time and the good appearance of the film is not deteriorated.

EXAMPLE

Hereinafter, the present invention is explained in more detail by examples. However, the present invention should not be considered to be limited thereto. In the following examples, unless notified specifically, all parts are parts by weight and all percents are weight %. Note that the calculating method of the polymerization ratio and the evaluation of the weathering resistance used in the examples are shown in the following.

(1) Calculating Method of Non-Volatile Component (Polymerization Ratio)

The weight (W1) after removing the cast film and the separator from the resultant composite film is measured. After the measurement, the composite film is heat-treated at 130° C. for two hours to remove the unreacted (meth)acrylic based monomer. The weight (W2) of the composite film after the heat-treatment is measured. The polymerization ratio (non-volatile component) is calculated according to the following equation.

Polymerization Ratio(Non-Volatile Component)(%) ={Weight after Heat-treatment($W2$)/Weight before Heat-treatment($W1$)}×100

(2) Evaluation of Weathering Resistance (Yellowing Resistance)

After peeling and removing the cast film and the separator from the composite film, an acryl based adhesive layer is formed at a thickness of 50 μm on one surface of the composite film to produce an adhesive tape. The adhesive tape is affixed on an acrylic baked white board (a standard test panel, manufactured by Nippon Testpanel Co., Ltd.) by using a roller, and then an initial b* value (at an angle of 15 degrees) is measured by using a multi-angle spectrocolorimeter ("MA68II" manufactured by X-Right K.K.).

After that, each of b* value (at an angle of 15 degrees) of the adhesive tape after an accelerated weathering test of 120 hours (10 cycles) and b* value (at an angle of 15 degrees) of the adhesive tape after an accelerated weathering test of 240 hours (20 cycles) was measured. The accelerated weathering test was performed by using a metal weather meter (product name "Daipla Metalweather KU-R5N" manufactured by DAIPLA WINTES Co., LTD) for four hours under the condition of irradiation (panel temperature of 63° C., relative humidity of 70%), four hours under the condition of irradiation and rainfall (panel temperature of 70° C., relative humidity of 90%), and four hours in the dark (panel temperature of 30° C., relative humidity of 98%), totally 12 hours are defined as one cycle. And this cycle is repeated 10 times or 20 times.

Example 1

In a reactor equipped with a condenser, a thermometer, and an agitator were charged 5 parts of acrylic acid (AA), 35 parts of isobornyl acrylate and 10 parts of n-butyl acrylate (BA) as an acrylic based monomer, and 36.4 parts of polyoxytetramethylene glycol (PTMG) (number-average molecular weight 650, manufactured by Mitsubishi Chemical Corporation) as a polyol. While agitating, 13.6 parts of hydrogenated xylylene diisocyanate (HXDI) was dripped and the mixture was allowed to react at 65° C. for 10 hours to obtain a urethane polymer-acrylic based monomer mixture (composite film precursor). The amount of the polyisocyanate component and the polyol component used was NCO/OH (equivalent ratio) =1.25.

After that, 3 parts of trimethylolpropane triacrylate, 1.25 parts of a hydroxyphenyltriazine based ultraviolet absorber ("TINUVIN 400" manufactured by Ciba Japan K.K.) and 1.25 parts of a hindered amine light stabilizer ("TINUVIN 123" manufactured by Ciba Japan K.K.) were added. Further, bis(2,4,6-trimethylbenzoyl)phenyl-phosphine oxide ("IRGACURE 819" manufactured by Ciba Japan K.K.) as a photopolymerization initiator so as to be 0.3 parts based on the acrylic components were added and then were sufficiently agitated so as to completely dissolve the additives and the like. Thus a precursor mixture of the composite film was obtained.

The precursor mixture was coated on a released-treated surface of a 50-μm thick released-treated polyethylene terephthalate film (PET film) as a cast film to a thickness after curing of 300 μm. On this was superimposed a release-treated polyethylene terephthalate (PET) film (thickness 38 μm) as a separator, and then ultraviolet ray (illuminance 290 mW/cm$^2$, light amount 4,600 mJ/cm²) from a metal halide lamp was irradiated to cure the coating to form a composite film (provided with a separator) on a release-treated PET film.

The obtained composite film was evaluated for calculation of the polymerization ratio (non-volatile component) and for weathering resistance (yellowing) according as the above-mentioned methods. Results are shown in Table 1.

Example 2

To 100 parts by weight of a solution of fluoroethylene vinyl ether in xylene and toluene ("LF600" manufactured by Asahi Glass Co., Ltd., containing 50 weight % of solid content), 10.15 parts of an isocyanate based crosslinking agent ("CORONATE HX" manufactured by Nippon Polyurethane Industry Co., Ltd.) as a curing agent and 3.5 parts of a xylene diluted solution (0.01 weight % of concentration of dibutyltin dilaurate) of dibutyltin dilaurate ("OL1" manufactured by Tokyo Fine Chemical Co., Ltd.) as a catalyst were added to obtain a coating solution for the a fluoroethylene vinyl ether layer. The coating solution was coated on a release-treated polyethylene terephthalate (PET) film (thickness 75 μm) to a thickness after curing of 10 μm, and was dried and cured at 140° C. for three minutes to form a PET film having a fluoroethylene vinyl ether layer.

Subsequently, a precursor mixture of a composite film prepared in the same manner as that in Example 1 was coated on the fluoroethylene vinyl ether layer of the PET film to a thickness after curing of 300 μm. On this was superimposed a release-treated polyethylene terephthalate (PET) film (thickness 38 μm) as a separator, and then the superimposed separator was irradiated with ultraviolet rays (illuminance 290 mW/cm², light amount 4,600 mJ/cm²) from a metal halide lamp to cure the coating to form a composite film (provided with a separator) having a fluoroethylene vinyl ether layer laminated on the release-treated PET film.

The obtained composite film was evaluated after removing the cast film and the separator, for the calculation of the polymerization ratio (non-volatile component) and the weathering resistance (yellowing) in the same manner as that in Example 1. The results are shown in Table 1. In evaluating the weathering resistance, the adhesive layer was provided on a opposite surface of the composite film to the surface laminated the fluoroethylene vinyl ether layer.

Example 3

A composite film (with a separator) on a release-treated PET film was prepared in the same manner as that in Example 1 except that the kind of the ultraviolet absorber was changed to a benzotriazole based ultraviolet absorber ("TINUVIN 384-2" produced by Ciba Japan K.K.).

The obtained composite film was measured and evaluated in the same manner as that in Example 1. The results are shown in Table 1.

Example 4

A composite film (with a separator) on a release-treated PET film was prepared in the same manner as that in Example 1 except that the kind and the amount of the ultraviolet absorber were changed to 0.7 parts of a hydroxyphenyltriazine based ultraviolet absorber ("TINUVIN 400" manufactured by Ciba Japan K.K.) and 0.7 parts of a benzotriazole type ultraviolet absorber ("TINUVIN 384-2" manufactured by Ciba Japan K.K.), the amount of the hindered amine light stabilizer was changed to 1.4 parts, and the amount of the photopolymerization initiator was changed to 0.5 parts based on the acrylic components.

The obtained composite film was measured and evaluated in the same manner as that in Example 1. The results are shown in Table 1.

Example 5

A composite film (with a separator) on a release-treated PET film was prepared in the same manner as that in Example 1 except that the kind of the hindered amine light stabilizer was changed to a hindered amine light stabilizer ("TINUVIN 765" manufactured by Ciba Japan K.K.).

The obtained composite film was measured and evaluated in the same manner as that in Example 1. The results are shown in Table 1.

Example 6

A composite film (with a separator) on a release-treated PET film was prepared in the same manner as that in Example 1 except that the kind and the amount of the hindered amine light stabilizer were changed to 0.625 parts of a hindered amine light stabilizer ("TINUVIN 622LD" manufactured by Ciba Japan K.K.).

The obtained composite film was measured and evaluated in the same manner as that in Example 1. The results are shown in Table 1.

Example 7

A composite film (with a separator) on a release-treated PET film was prepared in the same manner as that in Example 1 except that the amount of the ultraviolet absorber was changed to 1.4 parts, the kind and the amount of the hindered amine light stabilizers were changed to 0.7 parts of "TINUVIN 123" (manufactured by Ciba Japan K.K.) and 0.7 parts of "TINUVIN 765" (manufactured by Ciba Japan K.K.), and the amount of the photopolymerization initiator was changed to 0.5 parts based on the acrylic components.

The obtained composite film was measured and evaluated in the same manner as that in Example 1. The results are shown in Table 1.

Example 8

A composite film (with a separator) on a release-treated PET film was prepared in the same manner as that in Example 1 except that the kind of the photopolymerization initiator was changed to 2,4,6-trimethylbenzoyl-diphenyl-phosphine oxide ("DAROCUR TPO" manufactured by Ciba Japan K.K.).

The obtained composite film was measured and evaluated in the same manner as that in Example 1. The results are shown in Table 1.

Example 9

A composite film (with a separator) on a release-treated PET film was prepared in the same manner as that in Example except that the kind and the amount of the photopolymerization initiator were changed to 0.15 parts of bis(2,4,6-trimethylbenzoyl)phenyl-phosphine oxide (IRGACURE 819 manufactured by Ciba Japan K.K.) based on the acrylic components and 0.15 parts of 1-hydroxy-cyclohexyl-phenylketone ("IRGACURE 184" manufactured by Ciba Japan K.K.) based on the acrylic components.

The obtained composite film was measured and evaluated in the same manner as that in Example 1. The results are shown in Table 1.

Example 10

A composite film (with a separator) on a release-treated PET film was prepared in the same manner as that in Example 1 except that the kind of the photopolymerization initiator was changed to a mixture of bis(2,6-dimethoxybenzoyl)-2,4,4-trimethyl-pentylphosphine oxide and 1-hydroxy-cyclo-hexy-phenyl-ketone ("IRGACURE 1850" manufactured by Ciba Japan K.K.).

The obtained composite film was measured and evaluated in the same manner as that in Example 1. The results are shown in Table 1.

Example 11

A composite film (with a separator) on a release-treated PET film was prepared in the same manner as that in Example 1 except that the amount of the ultraviolet absorber was changed to 0.2 parts, the amount of the hindered amine light stabilizer was changed to 0.2 parts, and the amount of the photopolymerization initiator was changed to 0.06 parts based on the acrylic components.

The obtained composite film was measured and evaluated in the same manner as that in Example 1. The results are shown in Table 1.

Example 12

A composite film (with a separator) on a release-treated PET film was prepared in the same manner as that in Example 1 except that the amount of the ultraviolet absorber was changed to 0.4 parts, the amount of the hindered amine light stabilizer was changed to 0.4 parts, and the amount of the photopolymerization initiator was changed to 1.5 parts based on the acrylic components.

The obtained composite film was measured and evaluated in the same manner as that in Example 1. The results are shown in Table 1.

Example 13

A composite film (with a separator) on a release-treated PET film was prepared in the same manner as that in Example 1 except that the amount of the ultraviolet absorber was changed to 2.5 parts, the amount of the hindered amine light stabilizer was changed to 2.5 parts, and the amount of the photopolymerization initiator was changed to 0.7 parts based on the acrylic components.

The obtained composite film was measured and evaluated in the same manner as that in Example 1. The results are shown in Table 1.

Example 14

A composite film (with a separator) on a release-treated PET film was prepared in the same manner as that in Example 1 except that a composite film precursor prepared in the same manner as that in Example 1 was coated on a release-treated surface of a 50-μm thick release-treated polyethylene terephthalate (PET) film as a cast film to a thickness after curing of 500 μm.

The obtained composite film was measured and evaluated in the same manner as that in Example 1. The results are shown in Table 1.

Example 15

A composite film precursor was prepared in the same manner as that in Example 1 except that the amount of the ultraviolet absorber was changed to 0.4 parts, the amount of the hindered amine light stabilizer was changed to 0.4 parts, and the amount of the photopolymerization initiator was changed to 1.0 parts based on the acrylic components. Then, a composite film (with a separator) on a release-treated PET film was prepared in the same manner as that in Example 1 except that the obtained composite film precursor was coated on a release-treated surface of a 50-μm thick release-treated polyethylene terephthalate (PET) film as a cast film to a thickness after curing of 500 μm.

The obtained composite film was measured and evaluated in the same manner as that in Example 1. The results are shown in Table 1.

Example 16

A composite film precursor was prepared in the same manner as that in Example 1 except that the amount of the ultraviolet absorber was changed to 3.5 parts, the amount of the hindered amine light stabilizer was changed to 3.5 parts, and the amount of the photopolymerization initiator was changed to 1.0 parts based on the acrylic components. Then, a composite film (with a separator) on a release-treated PET film was prepared in the same manner as that in Example 1 except that the obtained composite film precursor was coated on a release-treated surface of a 50-μm thick release-treated polyethylene terephthalate (PET) film as a cast film to a thickness after curing of 100 μm.

The obtained composite film was measured and evaluated in the same manner as that in Example 1. The results are shown in Table 1.

Example 17

A composite film precursor was prepared in the same manner as that in Example 1 except that the amount of the ultraviolet absorber was changed to 0.2 parts, the amount of the hindered amine light stabilizer was changed to 0.2 parts, and the amount of the photopolymerization initiator was changed to 3.0 parts based on the acrylic components. Then, a composite film (with a separator) on a release-treated PET film was prepared in the same manner as that in Example 1 except that the obtained composite film precursor was coated on a release-treated surface of a 50-μm thick release-treated polyethylene terephthalate (PET) film as a cast film to a thickness after curing of 100 μm.

The obtained composite film was measured and evaluated in the same manner as that in Example 1. The results are shown in Table 1.

Comparative Example 1

A composite film (with a separator) on a release-treated PET film was prepared in the same manner as that in Example 1 except that neither a ultraviolet absorber nor a hindered amine light stabilizer was used (namely, 0 parts of the ultraviolet absorber and 0 parts of the hindered amine light stabilizer).

The obtained composite film was measured and evaluated in the same manner as that in Example 1. The results are shown in Table 2.

Comparative Example 2

A composite film (with a separator) on a release-treated PET film was prepared in the same manner as that in Example 1 except that the kind of the photopolymerization initiator was changed to 1-hydroxy-cyclohexyl-phenylketone ("IRGACURE 184" manufactured by Ciba Japan K.K.).

The obtained composite film was measured and evaluated in the same manner as that in Example 1. The results are shown in Table 2.

Comparative Example 3

A composite film (with a separator) on a release-treated PET film was prepared in the same manner as that in Example 1 except that the kind of the photopolymerization initiator was changed to 2,2-dimethoxy-1,2-diphenylethane-1-one ("IRGACURE 651" manufactured by Ciba Japan K.K.).

The obtained composite film was measured and evaluated in the same manner as that in Example 1. The results are shown in Table 2.

Comparative Example 4

A composite film (with a separator) on a release-treated PET film was prepared in the same manner as that in Example except that the kind and the amount of the photopolymerization initiator was changed to 0.15 parts of 1-hydroxy-cyclohexyl-phenylketone ("IRGACURE 184" manufactured by Ciba Japan K.K.) based on the acrylic components and 0.15 parts of 2,2-dimethoxy-1,2-diphenylethane-1-one ("IRGACURE 651" manufactured by Ciba Japan K.K.) based on the acrylic components.

The obtained composite film was measured and evaluated in the same manner as that in Example 1. The results are shown in Table 2.

Comparative Example 5

A composite film (with a separator) on a release-treated PET film was prepared in the same manner as that in Example 1 except that the kind of the photopolymerization initiator was changed to 2-benzyl-2-dimethylamide-1-(4-morpholinophenyl)-butane-1 ("IRGACURE 369" manufactured by Ciba Japan K.K.).

The obtained composite film was measured and evaluated in the same manner as that in Example 1. The results are shown in Table 2.

Comparative Example 6

A composite film (with a separator) on a release-treated PET film was prepared in the same manner as that in Example 1 except that the amount of the ultraviolet absorber was changed to 6.0 parts, the amount of the hindered amine light stabilizer was changed to 6.0 parts, and the amount of the photopolymerization initiator was changed to 2.0 parts based on the acrylic components.

The obtained composite film was measured and evaluated in the same manner as that in Example 1. The results are shown in Table 2.

Comparative Example 7

A composite film (with a separator) on a release-treated PET film was prepared in the same manner as that in Example 1 except that the amount of the ultraviolet absorber was changed to 0.2 parts, the amount of the hindered amine light stabilizer was changed to 0.2 parts, and the amount of the photopolymerization initiator was changed to 0.02 parts based on the acrylic components.

The obtained composite film was measured and evaluated in the same manner as that in Example 1. The results are shown in Table 2.

TABLE 1

| | Ultraviolet Absorber[Note 1] | | Light Stabilizer[Note 2] | Photopolymerization Initiztor[Note 3] | | | | Coat Layer | Non-Volatile Component (%) | Weathering Resistance (b *値) | | |
|---|---|---|---|---|---|---|---|---|---|---|---|---|
| | T400 | T384-2 | HALS | "A" | "B" | "C" | "D" | | | Initial | 120 h | 240 h |
| Example 1 | (1.25) | | T123 (1.25) | Irg819 (0.3) | | | | None | 99.54 | 1.46 | 2.54 | 2.92 |
| Example 2 | (1.25) | | T123 (1.25) | Irg819 (0.3) | | | | Provided | 98.97 | 1.19 | 1.95 | 2.31 |
| Example 3 | | (1.25) | T123 (1.25) | Irg819 (0.3) | | | | None | 98.77 | 1.51 | 1.81 | 1.85 |
| Example 4 | (0.7) | (0.7) | T123 (1.4) | Irg819 (0.5) | | | | None | 99.09 | 1.93 | 2.03 | 2.17 |
| Example 5 | (1.25) | | T765 (1.25) | Irg819 (0.3) | | | | None | 99.09 | 1.31 | 2.16 | 2.56 |
| Example 6 | (1.25) | | T622LD (0.625) | Irg819 (0.3) | | | | None | 99.09 | 1.06 | 2.22 | 2.63 |
| Example 7 | (1.4) | | T123 (0.7) T765 (0.7) | Irg819 (0.5) | | | | None | 99.14 | 1.57 | 2.32 | 2.71 |
| Example 8 | (1.25) | | T123 (1.25) | Darocur TPO (0.3) | | | | None | 98.69 | 1.46 | 2.21 | 2.91 |
| Example 9 | (1.25) | | T123 (1.25) | Irg819 (0.15) | Irg184 (0.15) | | | None | 99.08 | 1.18 | 2.16 | 2.47 |
| Example 10 | (1.25) | | T123 (1.25) | Irg1850 (0.3) | | | | None | 98.25 | 1.76 | 2.62 | 3.36 |
| Example 11 | (0.2) | | T123 (0.2) | Irg819 (0.06) | | | | None | 98.44 | 1.43 | 3.09 | 3.29 |
| Example 12 | (0.4) | | T123 (0.4) | Irg819 (1.5) | | | | None | 98.18 | 1.54 | 2.73 | 3.04 |
| Example 13 | (2.5) | | T123 (2.5) | Irg819 (0.7) | | | | None | 98.78 | 2.70 | 3.16 | 3.72 |
| Example 14 | (1.25) | | T123 (1.25) | Irg819 (0.3) | | | | None | 99.26 | 2.18 | 2.61 | 3.16 |
| Example 15 | (0.4) | | T123 (0.4) | Irg819 (1.0) | | | | None | 99.31 | 1.57 | 2.04 | 2.32 |
| Example | (3.5) | | T123 (3.5) | Irg819 (1.0) | | | | None | 99.23 | 1.57 | 2.73 | 3.06 |

TABLE 1-continued

| | Ultraviolet Absorber[Note 1] | | Light Stabilizer[Note 2] | Photopolymerization Initiztor[Note 3] | | | | Coat Layer | Non-Volatile Component (%) | Weathering Resistance (b *値) | | |
|---|---|---|---|---|---|---|---|---|---|---|---|---|
| | T400 | T384-2 | HALS | "A" | "B" | "C" | "D" | | | Initial | 120 h | 240 h |
| 16 Example 17 | (0.2) | | T123 (0.2) | Irg819 (3.0) | | | | None | 99.62 | 1.17 | 3.26 | 2.76 |

[Note] The number of parts is given in brackets in Table 1.

Notes for Table 1 and Table 2:
Note 1) Ultraviolet Absorber T400: TINUVIN 400 T384-2: TINUVIN 384-2
Note 2) Light Stabilizer HALS: Hindered Amine Light Stabilizer
Note 3) Photopolymerization Initiator
Kind "A" Irg819: Bisacylphosphine based Photopolymerization Initiator
Darocur TPO: Monoacylphosphine based Photopolymerization Initiator
Irg1850: Mixed type Photopolymerization Initiator
Kind "B" Irg184: α-hydroxyalkylphenone based Photopolymerization Initiator
Kind Irg651: Benzylketal based Photopolymerization Initiator
Kind Irg369: Aminoalkylphenone based Photopolymerization Initiator composite films were sticky sheets and in the condition of tackiness remaining. The composite films of Comparative Examples 5 to 6 had the initial b* values of more than 4.0.

According to the present invention, a composite film having excellent light-curing property and excellent weathering resistance was provided. Moreover, a composite film was provided which has the sufficient strength and causing no problem of an odor.

INDUSTRIAL APPLICABILITY

The composite film of the present invention can be used preferably for a film that is required to have flexibility and waterproofness. For example, the composite film can be used as a film for protection of a surface exposed to a harmful environment including weather outdoors, solvents, dusts, oils and fats, marine environments or the like, and as a film for

TABLE 2

| | Ultraviolet Absorber[Note 1] | | Light Stabilizer[Note 2] | Photopolymerization Initiator[Note 3] | | | | Coat Layer | Non-Volatile Componen (%) | Weathering Resistance (b *値) | | |
|---|---|---|---|---|---|---|---|---|---|---|---|---|
| | T400 | T384-2 | HALS | "A" | "B" | "C" | "D" | | | Initial | 120 h | 240 h |
| Comp. EX. 1 | | | | Irg819 (0.3) | | | | None | 98.93 | 1.02 | 6.20 | 8.03 |
| Comp. EX. 2 | (1.25) | | T123 (1.25) | | Irg184 (0.3) | | | None | 86.31 | 1.43 | 2.88 | 3.15 |
| Comp. EX. 3 | (1.25) | | T123 (1.25) | | | Irg651 (0.3) | | None | 95.04 | 1.24 | 2.50 | 2.95 |
| Comp. EX. 4 | (1.25) | | T123 (1.25) | | Irg184 (0.15) | Irg651 (0.15) | | None | 91.18 | 1.28 | 2.53 | 2.86 |
| Comp. EX. 5 | (1.25) | | T123 (1.25) | | | Irg369 (0.3) | | None | 97.82 | 8.51 | 2.85 | 3.34 |
| Comp. EX. 6 | (6.0) | | T123 (6.0) | Irg819 (2.0) | | | | None | 98.75 | 5.80 | 4.61 | 5.53 |
| Comp. EX. 7 | (0.2) | | T123 (0.2) | Irg819 (0.02) | | | | None | 85.58 | 0.72 | 1.77 | 2.21 |

[Note] The number of parts is given in brackets in Table 2.

Table 1 indicates that the composite films of Examples 1 to 17 of the present invention showed a small number of the initial b* value and also maintained a small number of the b* value even after a predetermined time passed, that is, the b* values after 120 hours and after 240 hours were also low and the composite films had excellent weathering resistance. In addition, the polymerization ratios of the composite films were 98% or more.

On the other hand, it revealed that the composite film of Comparative Example 1 that contained neither an ultraviolet absorber nor a hinderdamine light stabilizer showed the increase in the b* value with the lapse of time, and underwent severe yellowing, and was inferior in view of the wethering resistance. In addition, the composite films of Comparative Examples 2 to 4 and 7 had the polymerization ratios of less than 96% and the less non-volatile components, therefore the decoration. In addition, it is also preferred for a sheet for chipping to protect automobile bodies.

The invention claimed is:
1. A film, comprising at least a urethane polymer, at least one of ultraviolet absorber and at least one of hindered amine light stabilizer,
wherein the film is obtained from a film precursor containing at least a urethane polymer, from 0.1 weight % to 4.0 weight % of said at least one UV absorber based on 100 weight % of a film precursor, and from 0.1 weight % to 4.0 weight % of said at least one hindered amine light stabilizer based on 100 weight % of the film precursor,
wherein both an initial b* value of the film measured by a spectrocolorimeter (value at an angle of 15 degrees) and a b* value after being performed an accelerated weath- ering test for 120 hours (value at an angle of 15 degrees) are 4.0 or less and more than 0, wherein a non-volatile component after heating the film at 130° C. for two hours is 96% or more, wherein the percentage is a ratio determined by the weight after heat-treatment/weight before heat-treatment, and wherein the accelerated weathering test is performed by using a metal weather meter for four hours under the condition of irradiation at a panel temperature of 63° C. and relative humidity of 70%, four hours under the condition of irradiation and rainfall at a panel temperature of 70° C. and a relative humidity of 90%, and four hours in the dark at a panel temperature of 30° C. and a relative humidity of 98%, where a total of 12 hours is defined as one cycle, wherein the metal weather meter is DAIPLA METAL WEATHER KU-R5N manufactured by Daipla Wintes Co., Ltd.

2. The film according to claim 1, wherein the film has a b* value after performing an accelerated weathering test for 240 hours (value at an angle of 15 degrees) measured by a spectrocolorimeter is 4.0 or less and more than 0.

3. The film according to claim 1, wherein the film is one that has a (meth)acrylic based polymer and a urethane polymer.

4. The film according to claim 1, wherein the film is obtained by irradiating a precursor mixture in which at least one of ultraviolet absorber, at least one of hindered amine light stabilizer, and at least one of acylphosphine based photopolymerization initiator are added in a film precursor having at least a urethane polymer, with a light in a photosensitive wavelength range of the photopolymerization initiator.

5. The film according to claim 4, wherein the film precursor is one that has a (meth)acrylic based monomer and a urethane polymer.

6. The film according to claim 4, wherein the acylphosphine based photopolymerization initiator includes at least one of monoacylphosphine oxides represented by the following formula (I) and/or at least one of diacylphosphine oxides represented by the following formula (II)

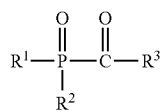

formula (I)

wherein, in the formula, $R^1$ represents an alkyl group of $C_1$-$C_{18}$; an alkyl group of $C_1$-$C_4$, a cycloalkyl group of $C_5$-$C_8$, a phenylalkyl group of $C_2$-$C_9$, a phenyl group, a naphthyl group, or a biphenyl group, substituted by halogen or an alkoxy group of $C_1$-$C_6$; a phenyl group, a naphthyl group, or a biphenyl group, substituted by at least one selected from the group consisting of halogen, an alkyl group of $C_1$-$C_{12}$, and an alkoxy group of $C_1$-$C_{12}$; or a five-membered or six-membered heterocyclic group containing a monovalent N, O, or S; $R^2$ represents a phenyl group, a naphthyl group, or a biphenyl group; a phenyl group, a naphthyl group, or a biphenyl group, substituted by at least one selected from the group consisting of halogen, an alkyl group of $C_1$-$C_{12}$, and an alkoxy group of $C_1$-$C_{12}$; a five-membered or six-membered heterocyclic group containing a monovalent N, O, or S, an alkoxy group of $C_1$-$C_{18}$, or a phenoxy group; or a phenoxy group, a benzyloxy group, or a cyclohexyloxy group, substituted by halogen, an alkyl group of $C_1$-$C_4$, or an alkoxy group of $C_1$-$C_4$; or $R^2$ and $R^1$ form a ring together with a phosphorus atom; $R^3$ represents an alkyl group of $C_1$-$C_{18}$; an alkyl group of $C_1$-$C_4$, a cycloalkyl group of $C_5$-$C_8$, a phenylalkyl group of $C_2$-$C_9$, a phenyl group, a naphthyl group, or a biphenyl group, substituted by halogen or an alkoxy group of $C_1$-$C_6$; a phenyl group, a naphthyl group, or a biphenyl group, substituted by at least one selected from the group consisting of halogen, an alkyl group of $C_1$-$C_{12}$, and an alkoxy group of $C_1$-$C_{12}$; a five-membered or six-membered heterocyclic group containing a monovalent N, O, or S; or represents a group represented by the following formula (III):

formula (III)

wherein, X represents an alkylene group of $C_2$-$C_8$ or a cyclohexylene group; or represents a phenylene group or a biphenylene group, unsubstituted or substituted by halogen, an alkyl group of $C_1$-$C_4$ or an alkoxy group of $C_1$-$C_4$;

formula (II)

wherein, in the formula, $R^4$ represents an alkyl group of $C_1$-$C_{18}$; an alkyl group of $C_1$-$C_4$, a cycloalkyl group of $C_5$-$C_8$, a phenylalkyl group of $C_2$-$C_9$, a phenyl group, a naphthyl group, or a biphenyl group, substituted by halogen or an alkoxy group of $C_1$-$C_6$; a phenyl group, a naphthyl group, or a biphenyl group, substituted by at least one selected from the group consisting of halogen, an alkyl group of $C_1$-$C_{12}$, and an alkoxy group of $C_1$-$C_{12}$; a five-membered or six-membered heterocyclic group containing a monovalent N, O, or S, an alkoxy group of $C_1$-$C_{18}$, or a phenoxy group; or a phenoxy group, a benzyloxy group, a cyclohexyloxy group, substituted by halogen, an alkyl group of $C_1$-$C_4$, or an alkoxy group of $C_1$-$C_4$; and $R^5$ and $R^6$, independently from each other, represent an alkyl group of $C_1$-$C_{18}$; an alkyl group of $C_1$-$C_4$, a cycloalkyl group of $C_5$-$C_8$, a phenylalkyl group of $C_2$-$C_9$, a phenyl group, a naphthyl group, or a biphenyl group, substituted by halogen or an alkoxy group of $C_1$-$C_6$; a phenyl group, a naphthyl group, or a biphenyl group, substituted by at least one selected from the group consisting of halogen, an alkyl group of $C_1$-$C_{12}$, and an alkoxy group of $C_1$-$C_{12}$; or a five-membered or six-membered heterocyclic group containing a monovalent N, O, or S.

7. The film according to claim 4, wherein the precursor mixture further contains an α-hydroxyalkylphenone based photopolymerization initiator.

8. The film according to claim 1, wherein the ultraviolet absorber contains at least one of ultraviolet absorber selected from the group consisting of benzotriazole ultraviolet absorbers and hydroxyphenyltriazine ultraviolet absorbers.

9. The film according to claim 5, wherein a blending amount of the photopolymerization initiator is from 0.05 weight % to 4.0 weight % based on the amount of a (meth) acrylic component.

10. The film according to claim 4, wherein a blending amount of the ultraviolet absorber is from 0.1 weight % to 4.0 weight % based on 100 weight % of the film precursor.

11. The film according to claim 4, wherein a blending amount of the hindered amine light stabilizer is from 0.1 weight % to 4.0 weight % based on 100 weight % of the film precursor.

12. The film according to claim 3, wherein the urethane based polymer is formed by at least one of diisocyanate selected from the group consisting of methylcyclohexane diisocyanate (hydrogenated TDI), dicyclohexylmethane diisocyanate (hydrogenated MDI), cyclohexane diisocyanate (hydrogenated PPDI), bis(isocyanatomethyl)cyclohexane (hydrogenated XDI), norbornene diisocyanate (NBDI), isophorone diisocyanate (IPDI), hexamethylene diisocyanate (HDI), butane diisocyanate, 2,4-trimethylhexamethylene diisocyanate, and 2,4,4-trimethylhexamethylene diisocyanate.

13. The film according to claim 3, wherein a weight ratio of the (meth)acrylic based polymer and the urethane based polymer in the film is within the range of acrylic based polymer/urethane based polymer=1/99 to 80/20.

14. The film according to claim 1, wherein the film precursor contains from 1 weight % to 15 weight % of a (meth)acrylic monomer having a carboxyl group.

15. An adhesive sheet, comprising an adhesive layer on at least one surface of the film according to claim 1.

16. The adhesive sheet according to claim 15, wherein the adhesive sheet is a protective sheet for protecting a surface of an adherend.

* * * * *